(12) United States Patent
Goenaga et al.

(10) Patent No.: US 6,825,970 B2
(45) Date of Patent: Nov. 30, 2004

(54) METHODS FOR ADDRESSING ELECTRO-OPTIC MATERIALS

(75) Inventors: Alberto Goenaga, Nashua, NH (US); Karl R. Amundson, Cambridge, MA (US); Michael L. Steiner, Methuen, MA (US); Libing Zhang, Sharon, MA (US)

(73) Assignee: E Ink Corporation, Cambridge, MA (US)

( * ) Notice: Subject to any disclaimer, the term of this patent is extended or adjusted under 35 U.S.C. 154(b) by 244 days.

(21) Appl. No.: 10/065,055

(22) Filed: Sep. 13, 2002

(65) Prior Publication Data

US 2003/0053189 A1 Mar. 20, 2003

Related U.S. Application Data

(60) Provisional application No. 60/322,370, filed on Sep. 14, 2001.

(51) Int. Cl.[7] .......................... G02B 26/00; G09G 3/34; G03G 17/04
(52) U.S. Cl. .......................... 359/296; 345/107; 430/32
(58) Field of Search .......................... 359/296; 345/105, 345/107, 108, 111; 204/450, 600; 430/32, 34, 38; 264/4

(56) References Cited

U.S. PATENT DOCUMENTS

| | | | |
|---|---|---|---|
| 3,668,106 A | 6/1972 | Ota | 358/305 |
| 3,756,693 A | 9/1973 | Ota | 345/107 |
| 3,767,392 A | 10/1973 | Ota | 430/35 |
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 4,473,029 A | 9/1984 | Fritz et al. | 399/236 |
| 5,745,094 A | 4/1998 | Gordon, II et al. | 345/107 |
| 5,760,761 A | 6/1998 | Sheridon | 345/107 |

(List continued on next page.)

FOREIGN PATENT DOCUMENTS

| | | |
|---|---|---|
| WO | WO 99/67678 | 12/1999 |
| WO | WO 00/05704 | 2/2000 |
| WO | WO 00/20922 | 4/2000 |
| WO | WO 00/26761 | 5/2000 |
| WO | WO 00/36560 | 6/2000 |
| WO | WO 00/38000 | 6/2000 |
| WO | WO 00/38001 | 6/2000 |
| WO | WO 00/67110 | 11/2000 |
| WO | WO 00/67327 | 11/2000 |
| WO | WO 01/02899 | 1/2001 |
| WO | WO 01/07961 | 2/2001 |
| WO | WO 01/08241 | 2/2001 |
| WO | WO 01/27690 | 4/2001 |
| WO | WO 02/01281 | 1/2002 |

OTHER PUBLICATIONS

Amundson, K., et al., "Flexible, Active–Matrix Display Constructed Using a Microencapsulated Electrophoretic Material and an Organic–Semiconductor–Based Backplane", SID 01 Digest, 160 (Jun. 2001).

(List continued on next page.)

*Primary Examiner*—Hung Xuan Dang
*Assistant Examiner*—Tuyen Tra
(74) *Attorney, Agent, or Firm*—David J. Cole

(57) ABSTRACT

The invention provides a first process for addressing an electro-optic material having first and second display states differing in at least one optical characteristic and being capable of being changed from its first to its second display state by application of an electric field to the material, the process comprising applying an electrically charged fluid to a portion of at least one surface of the material, thereby changing the display state of a portion of the material. The invention also provides a second process for addressing an electro-optic material, this process comprising contacting the electro-optic material with a non-conductive brush means wet with a conductive liquid while applying a potential difference between the brush means and the electro-optic material.

27 Claims, 2 Drawing Sheets

U.S. PATENT DOCUMENTS

| | | | |
|---|---|---|---|
| 5,777,782 A | 7/1998 | Sheridon | 359/296 |
| 5,808,783 A | 9/1998 | Crowley | 359/296 |
| 5,866,284 A | 2/1999 | Vincent | 430/37 |
| 5,930,026 A | 7/1999 | Jacobson et al. | 359/296 |
| 5,961,804 A | 10/1999 | Jacobson et al. | 204/606 |
| 6,017,584 A | 1/2000 | Albert et al. | 427/313.3 |
| 6,045,955 A | 4/2000 | Vincent | 430/45 |
| 6,054,071 A | 4/2000 | Mikkelsen, Jr. | 284/1.36 |
| 6,055,091 A | 4/2000 | Sheridon et al. | 359/296 |
| 6,064,410 A | 5/2000 | Wen et al. | 347/111 |
| 6,067,185 A | 5/2000 | Albert et al. | 359/296 |
| 6,081,285 A | 6/2000 | Wen et al. | 347/111 |
| 6,097,531 A | 8/2000 | Sheridon | 359/296 |
| 6,113,810 A | 9/2000 | Hou et al. | 252/572 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,128,124 A | 10/2000 | Silverman | 359/296 |
| 6,130,773 A | 10/2000 | Jacobson et al. | 359/296 |
| 6,130,774 A | 10/2000 | Albert et al. | 359/296 |
| 6,137,467 A | 10/2000 | Sheridon et al. | 345/107 |
| 6,144,361 A | 11/2000 | Gordon, II et al. | 345/107 |
| 6,147,791 A | 11/2000 | Sheridon | 359/296 |
| 6,177,921 B1 | 1/2001 | Comiskey et al. | 345/107 |
| 6,184,856 B1 | 2/2001 | Gordon, II et al. | 345/107 |
| 6,225,971 B1 | 5/2001 | Gordon, II et al. | 345/107 |
| 6,232,950 B1 | 5/2001 | Albert et al. | 345/107 |
| 6,241,921 B1 | 6/2001 | Jacobson et al. | 264/1.36 |
| 6,243,058 B1 | 6/2001 | Mikkelsen et al. | 345/84 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,271,823 B1 | 8/2001 | Gordon, II et al. | 345/107 |
| 6,300,932 B1 | 10/2001 | Albert | 345/107 |
| 6,301,038 B1 | 10/2001 | Fitzmaurice et al. | 259/265 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,376,828 B1 | 4/2002 | Comiskey | 250/216 |
| 6,377,387 B1 | 4/2002 | Duthaler et al. | 359/296 |
| 6,392,786 B1 | 5/2002 | Albert | 359/296 |
| 6,413,790 B1 | 7/2002 | Duthaler et al. | 438/21 |
| 6,445,489 B1 | 9/2002 | Jacobson et al. | 359/296 |
| 6,459,418 B1 | 10/2002 | Comiskey et al. | 345/107 |
| 6,473,072 B1 | 10/2002 | Comiskey et al. | 345/173 |
| 6,498,114 B1 | 12/2002 | Amundson et al. | 438/780 |
| 6,504,524 B1 | 1/2003 | Gates et al. | 345/107 |
| 6,506,438 B2 | 1/2003 | Duthaler et al. | 427/58 |
| 6,515,649 B1 | 2/2003 | Albert et al. | 345/107 |
| 6,525,865 B2 * | 2/2003 | Katase | 359/296 |
| 6,531,997 B1 | 3/2003 | Gates et al. | 345/107 |
| 6,535,197 B1 | 3/2003 | Comiskey et al. | 345/107 |
| 6,538,801 B2 * | 3/2003 | Jacobson et al. | 359/296 |
| 6,545,291 B1 | 4/2003 | Amundson et al. | 257/40 |
| 6,580,545 B2 | 6/2003 | Morrison et al. | 359/265 |
| 2001/0030639 A1 | 10/2001 | Goden | 345/107 |
| 2001/0045934 A1 | 11/2001 | Turner et al. | 345/107 |
| 2002/0019081 A1 | 2/2002 | Denis et al. | 438/149 |
| 2002/0021270 A1 | 2/2002 | Albert | 345/84 |
| 2002/0053900 A1 | 5/2002 | Jacobson et al. | 324/100 |
| 2002/0060321 A1 | 5/2002 | Kazlas et al. | 257/66 |
| 2002/0063661 A1 | 5/2002 | Comiskey et al. | 345/55 |
| 2002/0063677 A1 | 5/2002 | Drzaic | 345/107 |
| 2002/0075556 A1 | 6/2002 | Liang et al. | 359/296 |
| 2002/0090980 A1 | 7/2002 | Wilcox et al. | 455/566 |
| 2002/0106847 A1 | 8/2002 | Kazlas et al. | 438/200 |
| 2002/0113770 A1 | 8/2002 | Jacobson et al. | 345/107 |
| 2002/0130832 A1 | 9/2002 | Baucom et al. | 345/107 |
| 2002/0131147 A1 | 9/2002 | Paolini, Jr. et al. | 359/296 |
| 2002/0151246 A1 | 10/2002 | Ikeda et al. | 445/24 |
| 2002/0171910 A1 | 11/2002 | Pullen et al. | 359/296 |
| 2002/0180687 A1 | 12/2002 | Webber | 345/107 |
| 2002/0180688 A1 | 12/2002 | Drzalc et al. | 345/107 |
| 2002/0185378 A1 | 12/2002 | Honeyman et al. | 204/601 |
| 2003/0011560 A1 | 1/2003 | Albert et al. | 345/107 |
| 2003/0011867 A1 | 1/2003 | Loxley | 359/296 |
| 2003/0011868 A1 | 1/2003 | Zehner et al. | 359/296 |
| 2003/0020844 A1 | 1/2003 | Albert et al. | 349/33 |
| 2003/0025855 A1 | 2/2003 | Holman et al. | 349/86 |
| 2003/0034949 A1 | 2/2003 | Albert et al. | 345/107 |
| 2003/0038755 A1 | 2/2003 | Amundson et al. | 345/15 |
| 2003/0076573 A1 | 4/2003 | Gates et al. | 359/245 |

OTHER PUBLICATIONS

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Gutcho, M.H., Microcapsules and Microencapsulation Techniques, Noyes Data Corp., Park Ridge NJ, (1976).

Hou, J., et al., "Active Matrix Electrophoretic Displays Containing Black and White Particles with Opposite Polarities", SID 01 Digest, 164 (Jun. 2001).

Jacobson, J., et al., "The last book", IBM Systems J., 36, 457 (1997).

Ji, Y., et al., "P–50: Polymer Walls in Higher–Polymer–Content Bistable Reflective Cholesteric Displays", SID 96 Digest, 611 (1996).

Kazias, P., et al., "12.1" SVGA Microencapsulated Electrophoretic Active Matrix Display for Information Applicances", SID 01 Digest, 152 (Jun. 2001).

Vandegaer, J.E. (ed.), "Microencapsulation Processes and Applications", pp. v–x, 1–180 (Plenum Press, New York 1974).

Wood, D., Information Display, 18(3), 24 (Mar. 2002).

* cited by examiner

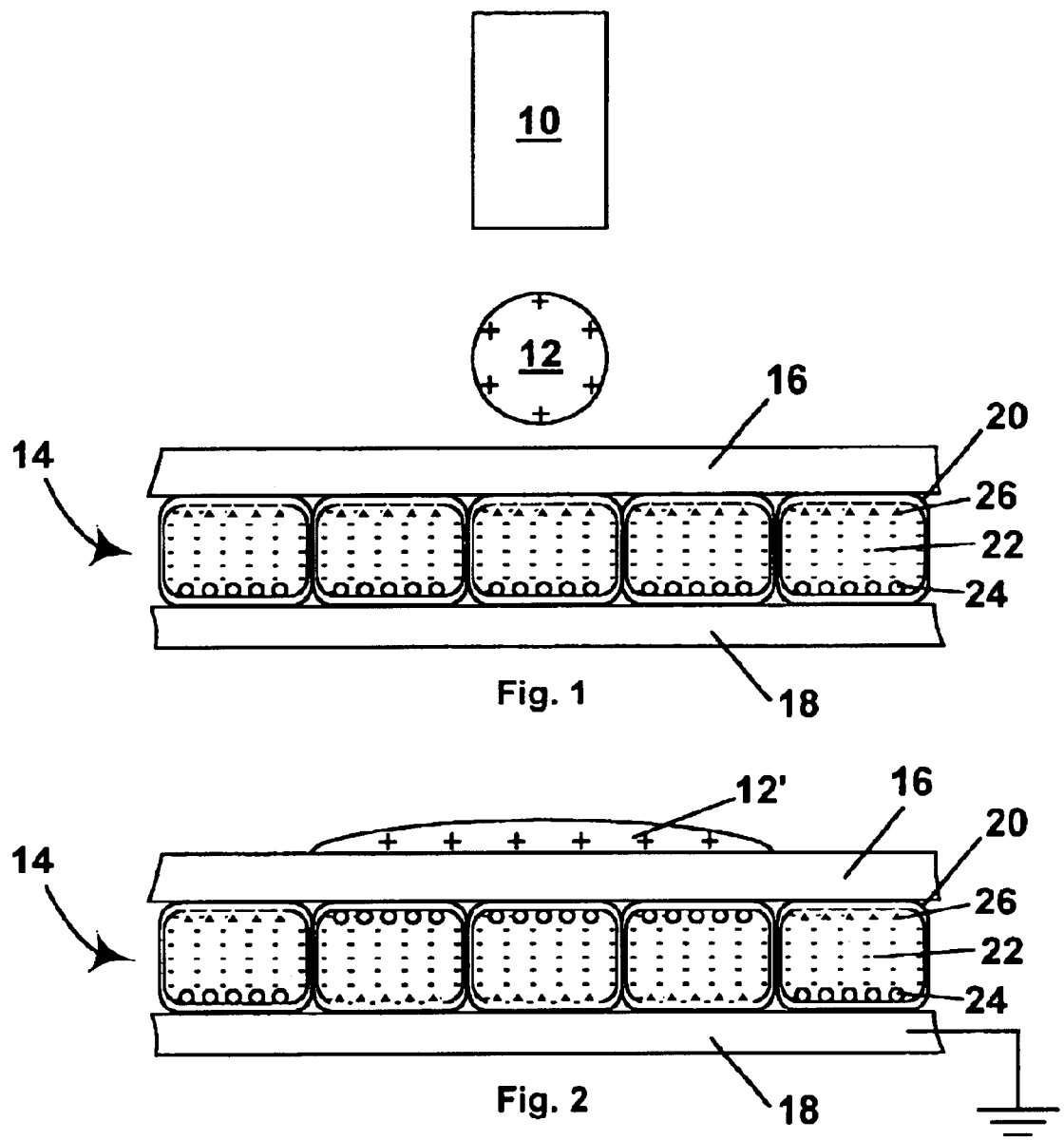

METHODS FOR ADDRESSING ELECTRO-OPTIC MATERIALS

CROSS REFERENCE TO RELATED APPLICATIONS

This application claims priority from Provisional Application Ser. No. 60/322,370, filed Sep. 14, 2001. The entire contents of this provisional application are herein incorporated by reference.

BACKGROUND OF INVENTION

This invention relates to methods for addressing electro-optic materials. More specifically, this invention relates to such methods in which an electrically charged fluid is used to carry charge on to the electro-optic material.

The entire disclosures of all patents and patent applications mentioned hereinafter are incorporated herein by reference.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface.

Another type of electro-optic medium is an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., information Display, 18(3), 24 (March 2002). See also Bach, U., et al., Adv. Mater., 2002, 14(11), 845. Nanochromic films of this type are also described, for example, in International Applications Publication Nos. WO 98/35267 and WO 01/27690, and in copending Applications Serial Nos. 60/365,368; 60/365,369; 60/365,385 and 60/365,365, all filed Mar. 18, 2002, Applications Serial Nos. 60/319,279; 60/319,280; and 60/319,281, all filed May 31, 2002; and Application Serial No. 60/319,438.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687 and 6,445,374; U.S. Patent Applications Publication Nos. 2001-0045934; 2002-0018042; 2002-0019081; 2002-0021270; 2002-0053900; 2002-0060321; 2002-0063661; 2002-0063677; 2002-0090980; and 2002-106847; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287; WO 02/07216; WO 02/45061; WO 02/47363; and WO 02/057,843.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6–19. See also copending application Ser. No. 09/683,903, filed Feb. 28, 2002, and the corresponding International Application PCT/US02/06393. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Applications Publication No. WO 02/01281, and published U.S. Application No. 2002-0075556, both assigned to Sipix Imaging, Inc.

Other types of electro-optic materials, for example, liquid crystals, especially polymer-dispersed liquid crystals, may also be used in the present invention.

In addition to the layer of electro-optic material, an electro-optic display obviously requires some means for producing the electric field needed to write on (i.e., change the optic state of) the electro-optic material. Hitherto, there have been two main groups of methods for writing on electro-optic materials. In the first group, the electro-optic material is permanently sandwiched between two electrode layers, as, for example, in the liquid crystal displays (LCD's) used in portable computers. In most such displays, one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display.

In the second group of writing methods, the electro-optic material is not permanently attached to the electrodes but is passed through a printer comprising a pair of electrodes between which the electro-optic material is passed to write an image thereon. See, for example, U.S. Pat. Nos. 6,081,285; 6,064,410; 6,045,955; and 5,866,284. Not surprisingly, many methods of this type are variations of conventional electrophotographic (xerographic) methods for printing on paper; instead of forming an imagewise distribution of charge on a photoconductor, using this imagewise charge distribution to form a corresponding imagewise distribution of toner on the photoconductor and then transferring this imagewise distribution of toner to form an image on paper, the imagewise distribution of charge can be used directly to form an image on electro-optic material.

There is a small third group of prior art methods, which may be regarded as hybrids of the two main groups discussed above. In this third group, one electrode is permanently attached to the electro-optic material, while a second electrode has the form of a stylus or similar movable member which is passed over the surface of the electro-optic material to form the desired image.

Each of the aforementioned groups of writing methods has certain problems. The first group, in which both electrodes are permanently attached to the electro-optic material, requires electrode arrays as large as the display itself and, at least in the case of high resolution displays, complicated electrical circuitry to apply the necessary charges to the arrays of electrodes needed. In the case of electro-optic materials, such as electrophoretic media, which have no threshold for switching between display states, it is necessary to use an active matrix driving technique in which each pixel of the display is provided with a separate transistor or similar non-linear device, and conventional methods for forming such arrays of non-linear devices are costly. Furthermore, although many electro-optic materials can be made in the form of paper-like sheets, conventional arrays of non-linear devices are much less flexible. Thus, although this group of methods is useful for forming small rigid displays, it is less useful for large area or flexible displays.

The second group of writing methods, in which the electro-optic material is moved through a printer, may experience problems with mechanical wear and tear of the electro-optic material caused by contact with the electrodes; while such wear and tear is negligible during the single pass of paper through a normal printer, it becomes a substantial problem when an electro-optic material is subjected to thousands of writings during its operating lifetime. Also, in this group of methods, problems may be experienced in maintaining satisfactory electrical contact between the electro-optic material and the electrodes, and variations in contact resistance may manifest themselves as artifacts in the final image. Finally, this group of methods are susceptible to edge effects caused by variation in electric field strength as the electro-optic material moves into and out of the field between the electrodes. Consider, for example, a bichromal ball electro-optic material comprising a large number of half-black, half-white spheres each having an internal dipole and rotatable within cavities in a matrix material. In theory, if one pixel of such a material is to be written black by passing the material through a print head, the head should apply an electric field perpendicular to the plane of the electro-optic material with a polarity such that the black hemispheres face a viewing surface of the material and no portion of the white hemispheres is visible. Such a perpendicular field may be applied at a central portion of the print head, but as the pixel leaves the print head it may experience an area in which the electric field is not precisely perpendicular, especially if the print head has to write the next pixel white. In such an area, the balls will tend to rotate so as to align their dipoles with the non-perpendicular field, with the result that after the electro-optic material has left the print head a small proportion of the white hemispheres will be visible in the supposedly black pixel. Similarly, a small proportion of black hemispheres may become visible in the supposedly white pixel. The net effect of these edge effects is an undesirable loss in contrast in the printed image.

The present invention provides a first process for addressing an electro-optic material which does not require the provision of electrodes permanently secured to the material, but which avoids the problems of establishing good but temporary electrical contact between the electro-optic material and an electrode in a printer. Essentially, the present method makes use of an electrically charged fluid to charge a surface of the electro-optic material and thus write thereon.

The present invention also provides a second process for addressing an electro-optic material which permits a non-conductive stylus to be used in the third group of writing methods discussed above.

SUMMARY OF INVENTION

In one aspect this invention provides a process for addressing an electro-optic material having first and second display states differing in at least one optical characteristic and being capable of being changed from its first to its second display state by application of an electric field to the material, the process comprising applying an electrically charged fluid to a portion of at least one surface of the material, thereby changing the display state of a portion of the material.

In a second aspect this invention provides a process for addressing an electro-optic material having first and second display states differing in at least one optical characteristic and being capable of being changed from its first to its second display state by application of an electric field to the material, the process comprising contacting the electro-optic material with a non-conductive brush means wet with a conductive liquid while applying a potential difference between the brush means and the electro-optic material.

BRIEF DESCRIPTION OF DRAWINGS

FIG. 1 of the accompanying drawings is a schematic side elevation of an apparatus being used to carry out the first process of the present invention;

FIG. 2 is a schematic side elevation similar to FIG. 1 but showing a later stage of the process.

DETAILED DESCRIPTION

Figure 3:
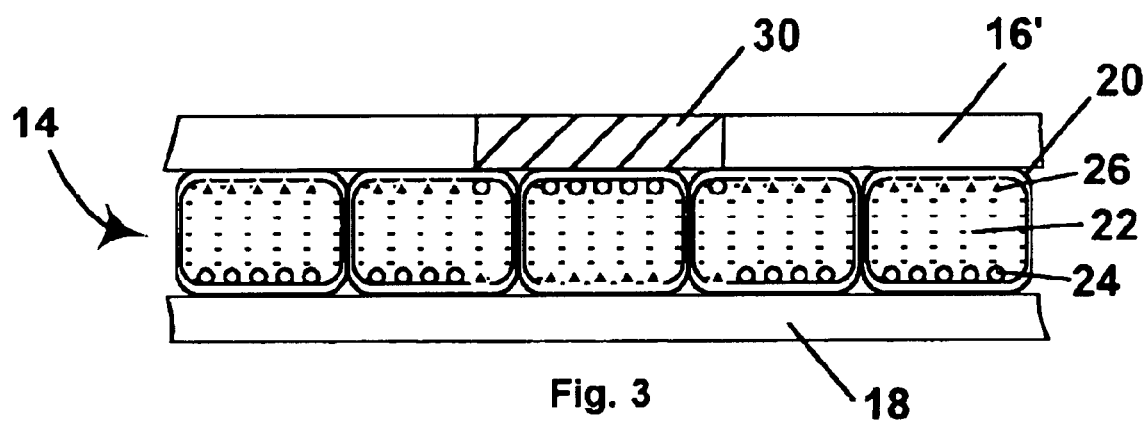
FIG. 3 is a schematic side elevation similar to FIGS. 1 and 2 but showing the modified form of the process shown in FIGS. 1 and 2.

As already noted, the present invention provides a first process for addressing an electro-optic material in which an electrically charged fluid is applied to a portion of at least one surface of the material, thereby changing the display state of this portion.

In this process, the fluid may be a gas, but is typically a liquid. In one embodiment of the invention, the liquid is applied from a liquid dispenser which does not contact the electro-optic material; the liquid may be applied as a plurality of discrete droplets of liquid. It will readily be apparent to those skilled in printing technology that such a process of the present invention using discrete droplets of a liquid charge carrier bears a close resemblance to a conventional ink jet printing process, except that the liquid carries electric charge to the material being addressed instead of a dye or pigment. Thus, the present process can make use of much prior art in ink jet technology. For example, methods for electrically charging small droplets are well developed, since such charging is used in continuous flow ink jet printers, and the same charging methods can be used to provide charged droplets for use in the present process. Similarly, much effort has been devoted to ensuring that ink jet heads provide droplets of constant size, and the resultant droplets are useful in the present process. Technology developed for precise positioning of the print head and print medium in conventional ink jet printers can be used for the same purposes in the present process.

The application of a charged fluid to the surface of the electro-optic material in the present process allows both fixed electrodes used in a conventional addressing process to be eliminated, if desired. The print head or similar device which applies the electrically charged fluid replaces one of the conventional electrodes. Although a connection to ground is required on the opposed side of the electro-optic material from that to which the fluid is applied, this ground connection could be supplied by a conductive roller or plate over which the electro-optic material passes as the charged fluid is being applied. Alternatively, of course, one surface of the electro-optic material could be provided with a coating of a conductive material to serve as the ground electrode. The electrical resistance of many electro-optic materials is sufficiently high that such a coating need not be highly conductive; for example, many conductive polymers can be used to form such a coating.

In the first process of the present invention, obviously, the electrostatic charge will tend to leak away from the area to which it is applied by the fluid and it is necessary that the charge persist at least long enough to effect the desired change in the display state of the electro-optic material. Accordingly, it is important that the surface of the material to which the charged fluid is applied have a sufficiently high surface electrical resistance to prevent premature dispersion of the charge. On the other hand, the material to which the charge is applied should have a relatively high conductivity perpendicular to its surface to facilitate current flow through the electro-optic material. Various materials having such anisotropic conductivity (so-called "z-axis conductivity") are known and may be used in the present process.

If, as is typically the case in practice, the electro-optic material is provided with a surface coating (for example, for protection against mechanical damage, or to add rigidity to the display medium), part of the electric field generated by the charged fluid will lie within the surface coating, and only the portion of the electric field within the electro-optic material itself will be effective in changing the display state of the material. Accordingly, care should be taken to "balance" the properties of the electro-optic material and the surface coating to ensure a sufficient field within the electro-optic material. The surface coating may also usefully serve as a barrier layer to shield the electro-optic material from the fluid. For example, electrochromic media are strongly sensitive to moisture, so if the present invention is carried out with an electrochromic material and an aqueous charge carrying liquid, a surface coating or other barrier layer should be provided to prevent the liquid adversely affecting the optical performance of the electrochromic material. Similarly, depending upon the material used to form the capsule walls, some encapsulated electrophoretic media may be sensitive to moisture, and again the provision of a surface coating or other barrier layer may be desirable to prevent liquid contacting the electrophoretic material.

The liquid used to apply charge in the present addressing method should normally not contain any dye or pigment since such dye or pigment will build up on the surface of the electro-optic material as it is repeatedly addressed and may eventually prevent observation of the display state of the electro-optic material, rendering this material useless. The use of a liquid which is itself colored such that the color is completely removed by evaporation of the liquid, may not be objectionable.

In the first process of the present invention using a charged liquid, as in any ink jet type printing process, it is important to control lateral spread of the charged liquid across the electro-optic material, since such lateral spread will cause switching of the electro-optic material over a greater area than that on which the liquid initially impacts, and this "smearing" will result in loss of resolution in the final image. To prevent such smearing, an absorptive layer capable of absorbing the charged liquid may be provided on the surface of the electro-optic material; since the function of this absorptive layer in the present method, namely preventing lateral spread of droplets landing on its surface, is identical to that of the anti-wicking coatings used in high quality ink jet papers, the materials used for such anti-wicking coatings may also be employed in the present method provided the electrical resistance of the coating is appropriate for use in the present invention.

After prolonged storage, electro-optic materials tend to assume a "gray" state which has optical characteristics intermediate their first and second display states. To produce a clear image on such materials, it is of course necessary to change the relevant areas of the material to the first and second display states. Although this could be done by spraying the whole surface of the material with charges of both polarities, arranging for generation of a stream of droplets of both polarities in the sequence required to form the desired image presents practical difficulties. Furthermore, using charges of both polarities requires that the addressing head traverse every pixel of the material. In many applications, only a small proportion of the text is in one display state; for example, a text-only black-on-white page is typically about 5 percent black, 95 percent white by area. If the addressing process of the present invention is to be used in such applications with an addressing head which traverses swathes of the electro-optic material harrow-fashion, in the same manner as in conventional desktop ink jet printers, the addressing speed can be increased by first setting the whole of the sheet of material to the predominant display state and then addressing only the small number of pixels which need to be changed to the other display state.

In the present addressing process, the whole electro-optic material can be set to one display state (hereinafter referred to as "pre-addressed") by laying a charge of the same polarity over the whole material. Pre-addressing may be effected using conventional charging devices such as a corotron. If the present process is being used on a continuous loop of electro-optic material (as for example, in a scrolling sign), the charging device can be disposed within the sign so that the electro-optic material is erased on each pass. If the present process is being used in a sheet fed printer similar to a conventional electrophotographic printer, the charging device can be provided between the sheet magazine and the addressing head, so that each sheet is pre-addressed as it is fed to the addressing head. If, however, the electro-optic material is of a type which has little or no threshold for switching, and will thus switch slowly even in a low electric field, it may be possible to pre-address the sheets by providing an electric field in the sheet magazine.

Whether or not an absorptive layer is used on the electro-optic material, it is advantageous for a liquid used to apply charge to evaporate rapidly so as to leave behind its charge. Thus, the liquid used is preferably volatile and may be organic, provided due attention is paid to flammability and environmental issues. Evaporation of the liquid may be assisted by heating of the electro-optic material and/or forced flow of gas past the material. For example, a radiant heater may be provided downstream of the addressing head to assist evaporation of the liquid.

Instead of being applied by a liquid dispenser which does not contact the surface of the electro-optic material, a charge carrying liquid used in the present invention may be applied by a "brush member" which contacts the material. The term "brush member" is not intended to be limited to conventional brushes comprising a pack of parallel bristles but is intended to cover other structures which permit application of a liquid to controlled areas of a surface. For example, the brush member could have essentially the form of a pen and comprise a tube through which the liquid is applied to the surface. Alternatively, the brush member could have the form of a wick through which liquid could pass by capillary action on to the surface of the electro-optic material.

The accompanying drawings illustrate the effect of using an absorptive coating on the electro-optic material in the first process of the present invention. FIG. 1 shows schematically a nozzle 10 directing an electrically charged droplet 12 towards an electro-optic material 14, both surfaces of which are covered by protective layers 16 and 18, at least one of these layers being light-transmissive. (The following description assumes that the layer 16 facing the nozzle 10 is transparent, and that the electro-optic material will be viewed via this layer and that the electro-optic material is opaque so that it is irrelevant whether the layer 18 is transparent or not.) The layer 18 is electrically conductive and, when the electro-optic material is being printed, is connected to ground. The electro-optic material 14 is shown as a microencapsulated electrophoretic medium of the type described in the aforementioned E Ink and MIT patents and applications and comprises a single layer of microcapsules 20 each containing a suspending fluid 22 containing two different types of electrophoretic particles 24 and 26 bearing charges of opposite polarity; for simplicity, the particles 24 are assumed to be white and negatively charged, and the particles 26 black and positively charged. Also, it is assumed that the droplet 12 is positively charged, and that the whole of the material 14 is initially in its dark state, with the black particles 26 adjacent the layer 16 and the white particles 24 adjacent the layer 18.

FIG. 2 shows the result of the droplet 12 hitting the protective layer 16 with the droplet not being absorbed by this layer. (The nozzle 10 is omitted from FIGS. 2 and 3.) The droplet spreads out to form an oblate hemi-ellipsoid 12', the major axes of which are shown as about three times the diameter of the original droplet 12. The white particles 24 are attracted to the positively charged hemi-ellipsoid 12', and the black particles 26 repelled therefrom, over the whole area covered by the hemi-ellipsoid, so that a white dot equal in size to the projection of the hemi-ellipsoid is produced on the electro-optic material 14. Furthermore, if the liquid does not evaporate rapidly, there is a danger that the hemi-ellipsoid 12' may be smeared by contact with sheet handling devices or other parts of the addressing device, with consequent further loss of definition of the image.

FIG. 3 shows a situation similar to FIG. 2, but in which the protective layer 16 has been replaced by a modified layer 16', which absorbs the droplet 12, thus producing a positively charged area 30 of wetted layer 16' which is only slightly larger than the original droplet 12. Accordingly, there is produced on the electro-optic material 14 a white dot slightly larger in size than the droplet 12 but substantially smaller than the dot produced in FIG. 2. Also, since the droplet 12 has been absorbed into the layer 16', there is little or no danger of smearing of the image if the charged area 30 is contacted by sheet handling devices or other parts of the addressing device.

In FIG. 3, it will be seen that in some microcapsules 20 adjacent the charged area 30, part of the microcapsule is shown as white and the remaining part black, as seen by an observer viewing the microcapsules through the layer 16'. This is in accordance with experimental observations, which show that in microencapsulated electro-optic materials, different parts of the same microcapsule can be in different display states when the different parts of the microcapsule is exposed to different electrical fields.

It is advantageous for the absorptive layer 16' to be insulating through both its volume and surface when dry but to have good electrical conductivity when wet to allow the maximum electric field to be applied to the electro-optic material 14.

As already mentioned, in the second process of this invention, an electro-optic material is contacted with a non-conductive brush means wet with a conductive liquid while applying a potential difference between the brush means and the electro-optic material. As with the brush member used in the first process of the invention, the term "brush means" is not intended to be limited to conventional brushes comprising a pack of parallel bristles but is intended to cover other structures which permit application of a liquid to controlled areas of a surface. For example, the brush means could have essentially the form of a pen and comprise a tube through which the liquid is applied to the surface. Alternatively, the brush means could have the form of a wick through which liquid could pass by capillary action on to the surface of the electro-optic material. However, it is generally preferred that the brush means be in the form of a true brush comprising a plurality of parallel bristles, and indeed conventional artists brushes have been found to give good results in the present process.

As discussed in the introductory part of this application, it has previously been known to address an electro-optic material using a movable stylus, which has been made of a conductive material, typically a metal. Replacing such a conductive stylus with a brush member in accordance with the present invention provides flexibility in addressing the electro-optic material in that, for example, the width of the line can be varied manually by controlling the pressure and/or direction of movement of the brush means in a manner which is not possible with a rigid metal stylus. Thus, the second process of the invention is very suitable for artistic and educational applications, with the electro-optic material serving as a re-usable paper.

In the second process of the invention, the liquid used needs to be conductive, although it can have a high resistivity given that most electro-optic materials need very little current to switch optical states. For example, when a conventional insulating paint brush was tested with an encapsulated electrophoretic material, with a power source providing 90 V connected between the metal ring holding the bristles of the brush and a conductive layer on the opposed side of the electrophoretic material from that to which the brush was applied, no imaging of the material took place either with a dry brush or with the brush wetted only with water. Imaging was effected when the water was replaced with an electrolyte dissolved in a solvent (for example, a salt such as sodium chloride dissolved in water), or when the brush was dipped into, or sprayed with, an anti-static agent and then wetted with water.

It has been found that such anti-static agents give good results in the second process of the present invention. Such anti-static agents are typically organic quaternary ammonium salts which can readily adhere to a plastic surface such as is often used as the surface layer on electro-optic materials. Alternatively, the anti-static agent can be internally doped into the plastic fibers typically used as bristles in brushes. Such anti-static agents can be used dissolved in alcoholic or aqueous solutions. It should be noted that there is an optimum concentration range for anti-static agents, since too low a concentration produces no or only a weak image, whereas too high a concentration can produce bleeding of the image.

In the second process of the present invention, as in the first, the surface of the electro-optic material to which the liquid is applied (i.e., the surface to which the brush means is applied) may be provided with a layer arranged to absorb the liquid.

Both the first and second processes of the invention can be practiced with a wide variety of electro-optic materials, including rotating bichromal member, electrochromic and liquid crystal materials. The electro-optic material may be also be a particle-based electrophoretic material comprising at least one type of electrically-charged particle and a suspending fluid, the at least one type of electrically-charged particle being capable of moving through the suspending fluid on application of an electric field to the electro-optic material. In a preferred embodiment of the invention, the electrophoretic material is encapsulated, i.e., the at least one type of electrically-charged particle and the suspending fluid are encapsulated in at least one capsule. Microcell electrophoretic materials may also be used.

Apart from possible modification of the surface layers of the electro-optic materials to prevent contact between this material and a liquid applied to the surface, as discussed above, no modifications of the electro-optic material itself are normally required for use in the present processes. Accordingly, it is not necessary to discuss the construction of the electro-optic material itself herein, and for further details the reader is referred to the patents, applications and papers previously mentioned.

It will readily be apparent that the addressing methods of the present invention are most useful with electro-optic materials which exhibit substantial bistability. (The terms bistable and bistability are used herein in their conventional meaning in the art to refer to materials such that, after any given pixel has been driven, by means of an addressing pulse of finite duration, to assume either its first or second display state, after the addressing pulse has terminated, that state will persist for at least several times, for example at least four times, the minimum duration of the addressing pulse required to change the state of the display element.) Particle-in-liquid based electrophoretic and bichromal ball electro-optic materials usually possess substantial bistability, and hence are preferred for use in the present method, whereas most liquid crystal based electro-optic materials do not. The bistability of particle-in-liquid based electrophoretic materials may be improved by providing in the suspending liquid a polymer which does not absorb on the particles, as described in copending application Ser. No. 10/063,236, filed Apr. 2, 2002; the entire disclosure of this copending application is herein incorporated by reference. See also the corresponding International Application PCT/US02/10267.

In both the processes of the invention, interesting effects can be produced by periodic variation of the charge applied to the fluid, for example by periodically varying the voltage applied in an ink jet type printing head used in the first process of the invention or the voltage applied to the brush means in the second process. Examples of useful types of periodic variation include alternating square pulses, triangle pulses, sawtooth waveforms of both ramp up and ramp down types, sine waves and any of the foregoing types with a DC offset. Such waveforms can be applied with a variety of amplitudes and frequencies.

A square pulse waveform of amplitude $V_0$ has the form:

$$V(t) = \begin{cases} -V_0 \text{ for } 0 < t < T/2 \\ V_0 \text{ for } T/2 < t < T \end{cases}$$

over the period 0<t<T, where t is the time. This function repeats periodically with period T. As a print head or brush moves across an electro-optic material, the square pulse waveform will give a dashed line with spatial period given by the print head or brush velocity divided by the period T. If the electro-optic material starts in the optical state that the voltage $V_0$ addresses, then only the regions where the voltage is at $-V_0$ will be optically switched, and vice versa. If the electro-optic material starts out in an optical state that is not addressed by either voltage $V_0$ or $-V_0$, then an alternating dashed line will be written.

A triangle pulse waveform of amplitude $V_0$ has the form:

$$V(t) = \begin{cases} V_0(-1+4t/T) \text{ for } 0 < t < T/2 \\ V_0(3-4t/T) \text{ for } T/2 < t < T \end{cases}$$

over the period T and is periodic with period T. Moving the a print head or brush across the surface of an electro-optic material with this voltage profile results in a faded dashed line, where the optical state varies continuously from one extreme and back to the other. The waveform may include a DC offset to provide a bias in the fraction of the line that is in the lighter states and the fraction in the darker states.

There are two types of sawtooth wave forms. In the first, the voltage ramps up, then jumps back down before starting the next period:

$$V(t)=V_0(-1+2t/T) \text{ for } 0<t<T$$

while in the second, the voltage starts high, and ramps down before jumping up at the beginning of the next period:

$$V(t)=V_0(1-2t/T) \text{ for } 0<t<T$$

Both of these waveforms are periodic with time period T, and can be used to give a dashed line with a repeating flare from one optical state to another as the print head or brush moves across the surface of the electro-optic material.

A sine wave of amplitude $V_0$ and period T has the form:

$$V(t)=V_0 \sin(2\pi t/T)$$

This waveform applied to a print head or brush moving across an electro-optic material will give a dashed line similar to that generated by a triangle waveform, but with more of the line at the two optical extremes.

Other periodic waveforms that are composed of a superposition of sine waves can also be used to develop other interesting effects. For example, such waveforms could be used to generate more complex lines, such as a "dot-dash" line composed of alternating short and long dashes.

It will be appreciated that apparatus designed to carry out the processes of the present invention may include user controls to vary the waveform for generation of the various optical effects already discussed. Such user controls may vary the type of waveform shape, the waveform frequency, and waveform amplitude, and the DC offset. For example, a piezoelectric actuator could be controlled by the user's applied pressure to vary one of the above-mentioned parameters.

It will be appreciated that the various optical effects already discussed are not limited to the processes of the present invention but will also be produced using other processes in which a mobile electrode is moved over the surface of an electro-optic material, such as the prior art processes using a metal stylus discussed above.

It will be apparent to those skilled in the technology of electro-optic displays that numerous changes and modifications can be made in the preferred embodiments of the invention described above without departing from scope of the invention. Accordingly, the foregoing description is to be construed in an illustrative and not in a limitative sense, the scope of the invention being defined solely by the appended claims.

What is claimed is:

1. A process for addressing an electro-optic material having first and second display states differing in at least one optical characteristic and being capable of being changed from its first to its second display state by application of an electric field to the material, the process comprising applying an electrically charged fluid to a portion of at least one surface of the material, thereby changing the display state of a portion of the material.

2. A process according to claim 1 wherein the fluid is a liquid.

3. A process according to claim 2 wherein the liquid is applied from a fluid dispenser which does not contact the electro-optic material.

4. A process according to claim 3 wherein the liquid is applied as a plurality of discrete droplets of liquid.

5. A process according to claim 2 wherein the surface of the electro-optic material to which the liquid is applied is provided with a layer arranged to absorb the liquid.

6. A process according to claim 2 further comprising evaporating the liquid from the surface of the electro-optic material.

7. A process according to claim 6 wherein the surface of the electro-optic material is heated to assist evaporation of the liquid.

8. A process according to claim 6 wherein a flow of gas is provided past the surface of the electro-optic material to assist evaporation of the liquid.

9. A process according to claim 2, wherein the liquid is applied from a brush member which contacts the electro-optic material.

10. A process according to claim 1 wherein a conductive coating is provided on the opposed side of the electro-optic material from that to which the fluid is applied.

11. A process according to claim 1 wherein a surface of the electro-optic material, on the opposed side of the electro-optic material from that to which the fluid is applied, is in contact with a conductive member while the fluid is being applied.

12. A process according to claim 1 wherein the fluid is applied to a layer having a greater electrical conductivity perpendicular to the surface to which the fluid is applied than parallel to this surface.

13. A process according to claim 1 wherein an area of the electro-optic material is first brought to a substantially uniform optical state and thereafter the electrically charged fluid is applied to a portion of said area to change the optical state of said portion, thereby producing an image on said area.

14. A process according to claim 1 in which the electro-optic material is bistable.

15. A process according to claim 1 wherein the electro-optic material is a rotating bichromal member, electrochromic or liquid crystal material.

16. A process according to claim 1 wherein the electro-optic material is a particle-based electrophoretic material comprising at least one type of electrically-charged particle and a suspending fluid, the at least one type of electrically-charged particle being capable of moving through the suspending fluid on application of an electric field to the electro-optic material.

17. A process according to claim 16 wherein the at least one type of electrically-charged particle and the suspending fluid are encapsulated in at least one capsule.

18. A process for addressing an electro-optic material having first and second display states differing in at least one optical characteristic and being capable of being changed from its first to its second display state by application of an electric field to the material, the process comprising contacting the electro-optic material with a non-conductive brush means wet with a conductive liquid while applying a potential difference between the brush means and the electro-optic material.

19. A process according to claim 18 wherein the conductive liquid comprises an electrolyte dissolved in a solvent.

20. A process according to claim 19 wherein the electrolyte is a salt and the solvent comprises water.

21. A process according to claim 19 wherein the electrolyte comprises an anti-static agent.

22. A process according to claim 21 wherein the anti-static agent comprises an organic quaternary ammonium salt.

23. A process according to claim 18 wherein the surface of the electro-optic material to which the liquid is applied is provided with a layer arranged to absorb the liquid.

24. A process according to claim 18 in which the electro-optic material is bistable.

25. A process according to claim 18 wherein the electro-optic material is a rotating bichromal member, electrochromic or liquid crystal material.

26. A process according to claim 18 wherein the electro-optic material is a particle-based electrophoretic material comprising at least one type of electrically-charged particle and a suspending fluid, the at least one type of electrically-charged particle being capable of moving through the suspending fluid on application of an electric field to the electro-optic material.

27. A process according to claim 26 wherein the at least one type of electrically-charged particle and the suspending fluid are encapsulated in at least one capsule.

* * * * *